United States Patent
Han et al.

(10) Patent No.: US 9,269,984 B2
(45) Date of Patent: Feb. 23, 2016

(54) ELECTRODE ASSEMBLY AND RECHARGEABLE BATTERY USING THE SAME

(75) Inventors: Man-Seok Han, Yongin-si (KR);
Jin-Kyu Hong, Yongin-si (KR);
Sung-Soo Kim, Yongin-si (KR);
Nam-Soon Choi, Yongin-si (KR);
Sae-Weon Roh, Yongin-si (KR);
So-Hyun Hur, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 542 days.

(21) Appl. No.: 12/877,981

(22) Filed: Sep. 8, 2010

(65) Prior Publication Data
US 2011/0117438 A1 May 19, 2011

Related U.S. Application Data

(60) Provisional application No. 61/261,724, filed on Nov. 16, 2009.

(51) Int. Cl.
*H01M 4/02* (2006.01)
*H01M 4/64* (2006.01)
(Continued)

(52) U.S. Cl.
CPC ............ *H01M 10/0413* (2013.01); *H01M 4/02* (2013.01); *H01M 4/13* (2013.01); *H01M 4/662* (2013.01); *H01M 4/74* (2013.01); *H01M 10/0525* (2013.01); *H01M 10/0585* (2013.01); *H01M 4/131* (2013.01); *H01M 4/485* (2013.01);
(Continued)

(58) Field of Classification Search
USPC .................. 429/129–147, 247–255, 208–246; 29/623.1–623.5
See application file for complete search history.

(56) References Cited

U.S. PATENT DOCUMENTS

| 6,063,519 A | 5/2000 | Barker et al. |
| 7,320,846 B2 | 1/2008 | Watanabe et al. |

(Continued)

FOREIGN PATENT DOCUMENTS

| CN | 1258938 A | 7/2000 |
| CN | 200959346 Y | 10/2007 |

(Continued)

OTHER PUBLICATIONS

European Search Report dated Mar. 2, 2011, for corresponding European Patent application 10178594.7.

(Continued)

*Primary Examiner* — Basia Ridley
*Assistant Examiner* — Caitlin Wilmot
(74) *Attorney, Agent, or Firm* — Christie, Parker & Hale, LLP

(57) ABSTRACT

An electrode assembly and a rechargeable battery using the same include a positive electrode including a positive current collector and a positive active material on the positive current collector; a negative electrode including a negative current collector and a negative active material on the negative current collector; an outer electrode including an outer current collector and an outer active material on the outer current collector, wherein the outer current collector includes an outer surface facing away from an outer separator and an inner surface facing toward the outer separator, and the outer active material is on both the outer surface and the inner surface, and wherein a thickness of the outer active material is less than at least one of a thickness of the positive active material or a thickness of the negative active material.

22 Claims, 5 Drawing Sheets

(51) Int. Cl.
  *H01M 10/04* (2006.01)
  *H01M 4/13* (2010.01)
  *H01M 4/74* (2006.01)
  *H01M 10/0525* (2010.01)
  *H01M 10/0585* (2010.01)
  *H01M 4/131* (2010.01)
  *H01M 4/485* (2010.01)
  *H01M 4/505* (2010.01)
  *H01M 4/525* (2010.01)
  *H01M 4/583* (2010.01)
  *H01M 4/66* (2006.01)

(52) U.S. Cl.
  CPC ............... *H01M 4/505* (2013.01); *H01M 4/525* (2013.01); *H01M 4/583* (2013.01); *H01M 4/661* (2013.01); *H01M 2004/021* (2013.01); *Y02E 60/122* (2013.01)

(56) References Cited

U.S. PATENT DOCUMENTS

| | | | |
|---|---|---|---|
| 7,432,018 B2 * | 10/2008 | Taguchi | 429/233 |
| 2007/0134556 A1 | 6/2007 | Sano et al. | |
| 2010/0027195 A1 | 2/2010 | Taguchi et al. | |

FOREIGN PATENT DOCUMENTS

| | | |
|---|---|---|
| CN | 101310350 A | 11/2008 |
| EP | 1 014 466 A1 | 6/2000 |
| EP | 1 487 034 A2 | 12/2004 |
| JP | 10-021950 | 1/1998 |
| JP | 2000-195501 | 7/2000 |
| JP | 2002-516473 | 6/2002 |
| JP | 2005-005163 | 1/2005 |
| JP | 2005-038612 A | 2/2005 |
| JP | 2007-188869 | 7/2007 |
| KR | 10-2000-0032030 A | 6/2000 |
| KR | 10-2000-0047375 | 7/2000 |
| KR | 10-2005-0106680 A | 11/2005 |
| KR | 10-2008-0006819 A | 1/2008 |
| WO | WO 97/08769 | 3/1997 |
| WO | WO 99/60651 | 11/1999 |

OTHER PUBLICATIONS

Korean Office action dated Sep. 18, 2012 issued to Korean Patent Application No. 10-2010-0101416, 7 pages.
Japanese Office action dated Jan. 22, 2013, for corresponding Japanese Patent application 2010-254113, (2 pages).
Patent Abstracts of Japan, and English machine translation of Japanese Publication 10-021950, (10 pages).
Patent Abstracts of Japan, and English machine translation of Japanese Publication 2000-195501, (14 pages).
Patent Abstracts of Japan, and English machine translation of Japanese Publication 2007-188869, (20 pages).
SIPO Office action dated Dec. 20, 2012, for corresponding Chinese Patent application 201010529485.5, with English transaltion, (15 pages).
SIPO Office action dated Sep. 16, 2013, with English translation, for corresponding Chinese Patent application 201010529485.5, (6 pages).
SIPO Office action dated Oct. 11, 2014, with English translation, of corresponding Chinese Patent application 201010529485.5, (17 pages).
SIPO Office action dated Apr. 4, 2014, with English translation, corresponding to Chinese Patent application 201010529485.5, (6 pages).
SIPO Decision of Rejection dated Feb. 4, 2015, with English translation, for corresponding Chinese Patent application 201010529485.5, (16 pages).
EPO Office action dated Jan. 15, 2015, for corresponding European Patent application 10178594.7, (4 pages).
Espacenet English Abstract, and English machine translation of Chinese Publication 200959346 dated Oct. 10, 2007, (5 pages).
SIPO Office action dated Oct. 23, 2015, with English translation, for corresponding Chinese Patent application 201010529485.5, (14 pages).

\* cited by examiner

ELECTRODE ASSEMBLY AND RECHARGEABLE BATTERY USING THE SAME

CROSS-REFERENCE TO RELATED APPLICATION

This application claims priority to and the benefit of U.S. Provisional Patent Application No. 61/261,724, filed on Nov. 16, 2009 in the United States Patent and Trademark Office, the entire content of which is incorporated herein by reference.

BACKGROUND

1. Field

Aspects of embodiments of the present invention relate to an electrode assembly and a rechargeable battery using the same, and more particularly, to an outer electrode of an electrode assembly.

2. Description of the Related Art

A rechargeable battery can be recharged and discharged, unlike a primary battery that cannot be recharged. A low-capacity rechargeable battery is typically used for a small portable electronic device such as a mobile phone, a laptop computer, and a camcorder, and a large-capacity rechargeable battery is typically used as an electrical source or a power storage source for driving a motor, such as for a hybrid vehicle.

A large-capacity, high-power rechargeable battery with high energy density using a non-aqueous electrolyte has been developed, and the rechargeable battery is formed with a large-capacity, high-power rechargeable battery module by coupling a plurality of rechargeable batteries in series or in parallel in order to use it to drive a device, such as a motor for an electric vehicle requiring a large amount of electric power.

The rechargeable battery may be fabricated in a cylindrical shape, a prismatic shape, a pouch shape, and the like. In a typical rechargeable battery, active material layers are coated on both sides of positive and negative electrodes.

Outer active material layers of outermost electrodes of a stacked-type rechargeable battery do not participate in charge and discharge reaction and are not needed.

However, if the unnecessary outer active material layer is removed, electrodes may be bent during compressing after coating. During electrode fabrication, a one-side coating process and assembling process related thereto are added to a general fabrication process. In consideration of the above, an outermost electrode generally includes active material layers coated on both sides of the electrode. However, this may incur an increase of weight and volume, resulting in a decrease of energy density. It also presents a problem of waste of active materials.

The above information disclosed in this Background section is only for enhancement of understanding of the background of the described technology and, therefore, it may contain information that does not form the prior art that is already known in this country to a person of ordinary skill in the art.

SUMMARY

According to an aspect of embodiments of the present invention, a rechargeable battery has high energy density.

According to one embodiment of the present invention, an electrode assembly includes: a positive electrode including a positive current collector and a positive active material on the positive current collector; a negative electrode including a negative current collector and a negative active material on the negative current collector; an outer electrode including an outer current collector and an outer active material on the outer current collector, one of the positive electrode or the negative electrode being between the outer electrode and the other of the positive electrode or the negative electrode; an inner separator between the positive electrode and the negative electrode; and an outer separator between the outer electrode and the one of the positive electrode or the negative electrode, wherein the outer current collector includes an outer surface facing away from the outer separator and an inner surface facing toward the outer separator, and the outer active material is on both the outer surface and the inner surface, and wherein a thickness of the outer active material is less than at least one of a thickness of the positive active material or a thickness of the negative active material.

In one embodiment, the thickness of the outer active material is about one half of at least one of the thickness of the positive active material or the thickness of the negative active material.

The outer current collector may include a sheet having a plurality of openings. The sheet may be a mesh-type sheet.

At least one of the positive current collector or the negative current collector may include a sheet having a plurality of openings. The outer current collector may include a sheet having a plurality of openings larger than the openings of the at least one of the positive current collector or the negative current collector.

At least one of the positive current collector or the negative current collector may include a sheet that does not have openings.

In one embodiment, the outer electrode is a first outer electrode, and the electrode assembly further includes a second outer electrode, the positive electrode and the negative electrode being between the first and second outer electrodes.

A thickness of the outer active material on the outer surface may be different than a thickness of the outer active material on the inner surface.

The thickness of the outer active material on one of the outer surface or the inner surface may be between about 1 to about 10 times of the thickness of the outer active material on the other of the outer surface or the inner surface. In one embodiment, the thickness of the outer active material on the one of the outer surface or the inner surface is between about 1 to about 3 times of the thickness of the outer active material on the other of the outer surface or the inner surface.

According to another embodiment of the present invention, a rechargeable battery includes: an electrode assembly including a positive electrode including a positive current collector and a positive active material on the positive current collector; a negative electrode including a negative current collector and a negative active material on the negative current collector; an outer electrode including an outer current collector and an outer active material on the outer current collector, one of the positive electrode or the negative electrode being between the outer electrode and the other of the positive electrode or the negative electrode; an inner separator between the positive electrode and the negative electrode; and an outer separator between the outer electrode and the one of the positive electrode or the negative electrode, wherein the outer current collector includes an outer surface facing away from the outer separator and an inner surface facing toward the outer separator, and the outer active material is on both the outer surface and the inner surface, and wherein a thickness of the outer active material is less than at least one of a thickness of the positive active material or a thickness of the negative active material; and a case containing the electrode assembly therein.

According to another embodiment of the present invention, an electrode assembly includes a positive electrode including a positive active material coated on a positive current collector, a negative electrode including a negative active material coated on a negative current collector, and a separator interposed between the positive and negative electrodes. In one embodiment, the outermost electrode disposed on the outermost side among the positive electrodes and the negative electrodes includes a mesh outer current collector and an active material layer having less thickness than a thickness of an active material of a positive electrode or a negative electrode disposed inside.

According to another embodiment of the present invention, a rechargeable battery includes an electrode assembly including a positive electrode including a positive active material coated on a positive current collector, a negative electrode including a negative active material coated on a negative current collector, and a separator interposed between the positive and negative electrodes; a case housing the electrode assembly; and a terminal electrically connected with the electrode assembly and exposed outside of the case, wherein the outermost electrode disposed on the outermost side of the positive electrode and the negative electrode in the electrode assembly includes a mesh current collector and an active layer formed on the mesh current collector and having a volume less than that of the positive electrode and the negative electrode disposed inside.

According to another aspect of embodiments of the present invention, an energy density is improved, and the unnecessary raw material waste is prevented or reduced by forming an active material layer having a decreased thickness on the outermost electrode.

BRIEF DESCRIPTION OF THE DRAWINGS

The above and other features and advantages of the present invention will become more apparent by describing in detail some exemplary embodiments thereof with reference to the attached drawings.

DESCRIPTION OF REFERENCE NUMERALS INDICATING SOME ELEMENTS IN THE DRAWINGS

Figure 1:
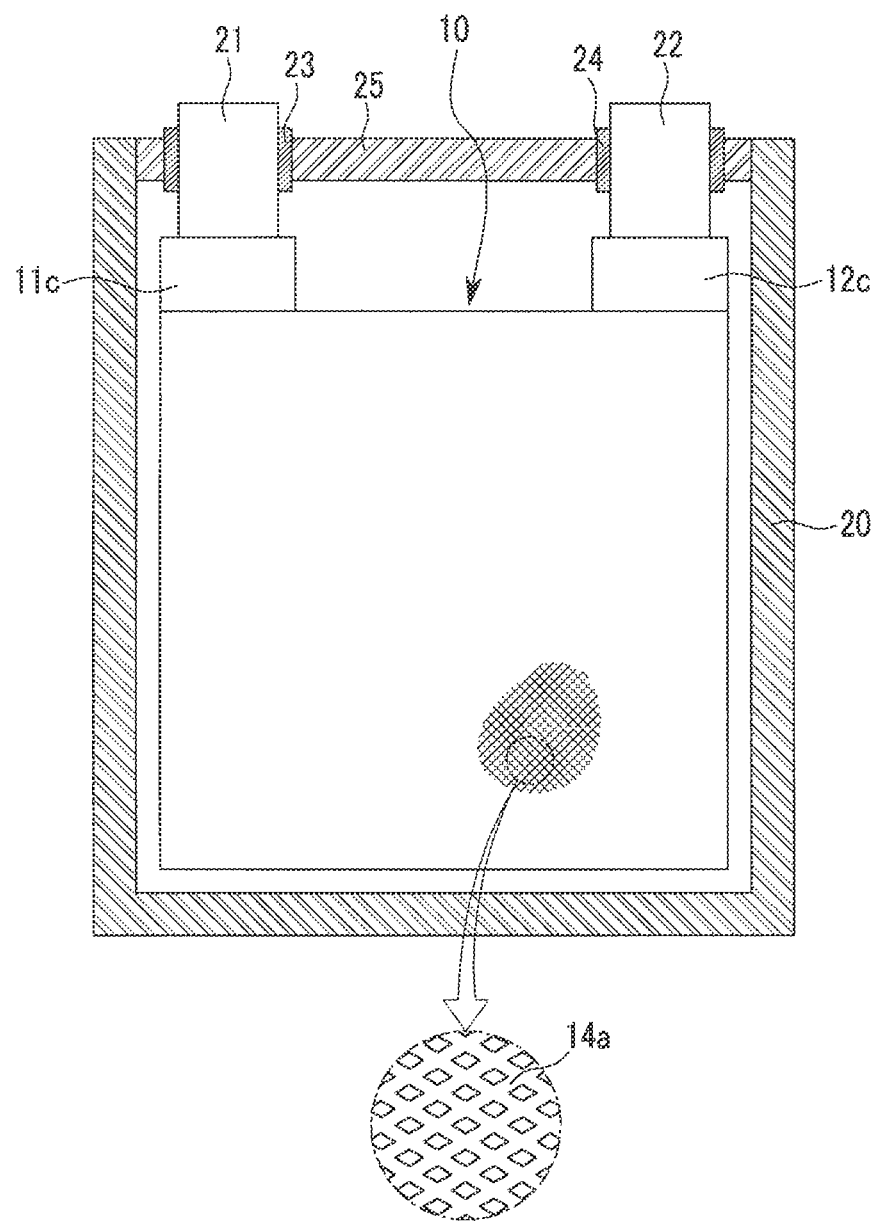
FIG. 1 is a cross-sectional view of a rechargeable battery according to an embodiment of the present invention.

100: rechargeable battery
10, 30, 40, 50: electrode assembly
11, 31, 41, 51: positive electrode
11a, 31a, 41a, 51a: positive current collector
11b, 31b, 41b, 51b: positive active material layer
11c: positive uncoated region
12, 32, 42, 52: negative electrode
12a, 32a, 42a, 52a: negative current collector
12b, 32b, 42b, 52b: negative active material layer
12c: negative uncoated region
13, 33, 43, 53: separator
14, 34, 44, 54: outermost electrode
14a, 34a, 44a, 54a: outer current collector
14b, 34b, 44b, 54b: outer active material layer
20: case
21: positive terminal
22: negative terminal

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Like reference numerals designate like elements throughout the specification and drawings.

Figure 2:
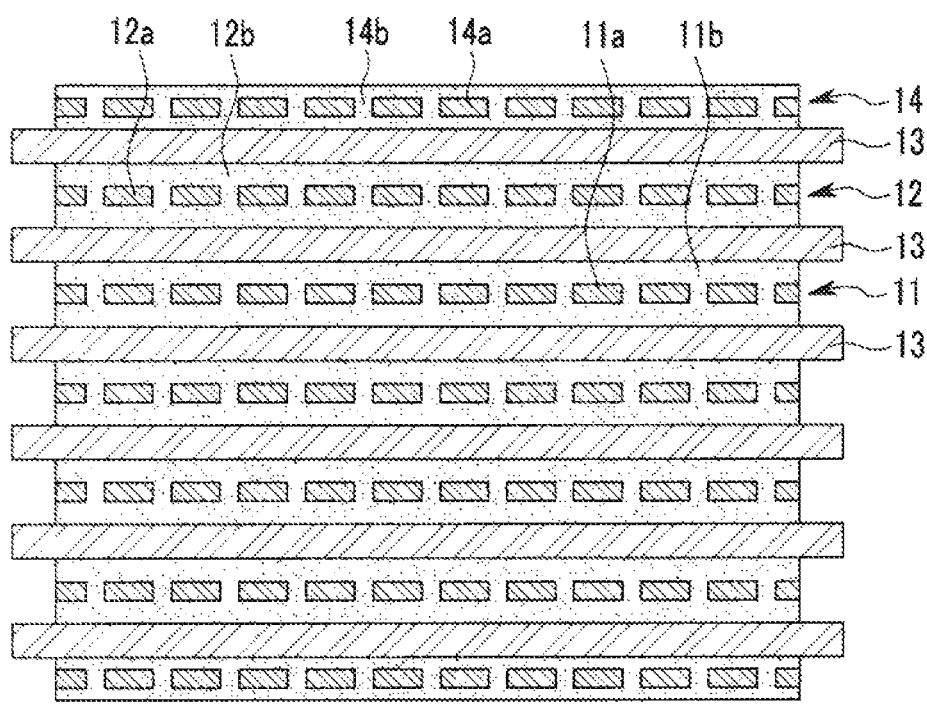
FIG. 2 is a cross-sectional view of an electrode assembly of a rechargeable battery according to another embodiment of the present invention.

FIG. 1 is a cross-sectional view of a rechargeable battery according to an embodiment of the present invention, and FIG. 2 is a cross-sectional view of an electrode assembly of a rechargeable battery according to another embodiment of the present invention.

Referring to FIG. 1, a rechargeable battery 100 includes an electrode assembly 10 for performing charge and discharge, and a case 20 housing the electrode assembly 10.

The case 20, in one embodiment, forms an external housing for the rechargeable battery 100 and provides a space for housing, or containing, the electrode assembly 10 therein. For example, the case 20 may be formed in a pouch shape of film or in a cuboid prismatic shape having an opening for receiving the electrode assembly 10 (e.g., an electrode assembly having a shape corresponding to the cuboid case). In one embodiment, the case 20 may be formed of a metal, such as aluminum, aluminum alloy, nickel-plated steel, or the like, or alternatively, as a pouch of laminate film, or of any other suitable material. In one embodiment, a cap assembly 25 is mounted to the opening of the case 20, thereby sealing the case 20.

In one embodiment, a positive terminal 21 and a negative terminal 22 are electrically connected to the electrode assembly 10, and the positive terminal 21 and the negative terminal 22 are protruded outside the case 20. The positive terminal 21 and the negative terminal 22, in one embodiment, are fixed by the cap assembly 25.

In one embodiment, the positive terminal 21 is electrically connected to a positive uncoated region 11c of the electrode assembly 10, and the negative terminal 22 is electrically connected to a negative uncoated region 12c of the electrode assembly 10. Further, in one embodiment, the positive terminal 21 and the negative terminal 22 protrude outside the case 20, a sealing member 23 is mounted between the positive terminal 21 and the case 20, and another sealing member 23 is mounted between the negative terminal 22 and the case 20. The positive terminal 21 and the negative terminal 22 may protrude in the same direction without limitation, or may protrude in opposite directions from each other.

With reference to FIG. 2, the electrode assembly 10 includes a positive electrode 11, a negative electrode 12, and a separator 13 disposed between the positive electrode 11 and the negative electrode 12. Further, in one embodiment, the electrode assembly 10 has a structure in which a plurality of positive electrodes 11 and negative electrodes 12 are laminated together in a stacked structure with a separator 13 between each positive electrode 11 and negative electrode 12.

The positive electrode 11, in one embodiment, has a structure including positive active material layers 11b formed on both surfaces of a positive current collector 11a. The positive current collector 11a, in one embodiment, is formed of aluminum, stainless steel, or the like, or any other suitable material, and formed in a mesh square sheet, or any other suitable shape, having a plurality of openings or pores formed therein. The openings, in one embodiment, are diamond-shaped and have a length along a long diagonal line of 0.8 to 1.6 mm and a width along a short diagonal line of 0.4 to 1.2 mm. In one embodiment, the length along the long diagonal line is about 1.2 mm and the width along the short diagonal line is about 0.8 mm. However, embodiments of the present invention are not limited thereto. That is, in other embodiments, the openings may have any other suitable shape and size. The positive active material layer 11b, in one embodiment, includes $LiCoO_2$, $LiMnO_2$, $LiFePO_4$, $LiNiO_2$, $LiMn_2O_4$, or the like, a conductive agent, a binder, or the like. The positive active material layer 11b, in one embodiment, is coated on the positive current collector 11a, or in other embodiments, may be attached thereon using a lamination method or any other suitable method.

In one embodiment, a positive uncoated region 11c where the positive current collector 11a is exposed, rather than the positive active material layer 11b being formed thereon, is formed on the positive electrode 11.

The negative electrode 12, in one embodiment, has a structure including negative active material layers 12b formed on both surfaces of a negative current collector 12a. The negative current collector 12a, in one embodiment, is formed of copper, stainless steel, aluminum, or the like, or any other suitable material, and formed in a mesh square sheet, or any other suitable shape, having a plurality of openings or pores formed therein. The openings may be configured as described above with respect to the openings of the positive current collector 11a. The negative active material layer 12b, in one embodiment, includes $Li_4Ti_5O_{12}$ or a carbon-based active material, a conductive agent, a binder, or the like. In one embodiment, a negative uncoated region 12c where the negative current collector 12a is exposed, rather than the negative active material layer 12b being formed thereon, is formed on the negative electrode 12. The negative active material layer 12b, in one embodiment, is coated on the negative current collector 12a, or in other embodiments, may be attached thereon using a lamination method or any other suitable method.

The separator 13, in one embodiment, is formed of a porous material for insulating between the positive electrode 11 and the negative electrode 12 and providing a passage for ions.

In one embodiment, as shown in FIG. 2, a plurality of positive electrodes 11 and negative electrodes 12 are stacked and laminated with a separator 13 between each pair of a positive electrode 11 and an adjacent negative electrode 12. Further, an outermost electrode 14 is disposed on the outermost side of electrode assembly 10. According to one embodiment, the outermost electrode 14 is disposed adjacent to the negative electrode 12 with the separator 13 therebetween (see FIG. 2), so the outermost electrode 14 acts as a positive electrode. However, the present invention is not limited thereto and, in other embodiments, the outermost electrode 14 may be formed to act as a negative electrode.

The outermost electrode 14, in one embodiment, includes an outer current collector 14a and outer active material layers 14b formed on both surfaces of the outer current collector 14a. Further, in one embodiment, the outer active material layer 14b of the outermost electrode 14 has a thickness that is less than that of the positive active material layer 11b. In one embodiment, the outer current collector 14a and the outer active material layers 14b of the outermost electrode 14 are respectively formed of the same material as in the positive current collector 11a and the positive active material layer 11b. In one embodiment, the outer current collector 14a includes a mesh sheet having a plurality of openings that are larger in size than openings of the positive current collector 11a. The outer active material layer 14b, in one embodiment, has a thickness of about one half of the thickness of the positive active material layer 11b. In other words, the amount of the outer active material layer 14b, in one embodiment, is the amount capable of reacting with the negative active material layer 12b disposed on one surface of the negative electrode 12 disposed adjacent the outermost electrode 14 with the separator 13 interposed therebetween, so as to prevent or reduce unnecessary cost associated with a thickness of an outer active material layer exceeding an amount capable of reacting. In one embodiment, the thickness of the positive active material layer 11b, and also a thickness of the negative active material layer 12b, is 240 to 440 µm, and further, in one embodiment, is 320 to 340 µm. Also, in one embodiment, the thickness of the outer active material layer 14b is 120 to 220 µm, and further, in one embodiment, is 160 to 170 µm. However, embodiments of the present invention are not limited to the above-described thicknesses and, in other embodiments, the positive active layer 11b, the negative active layer 12b, and the outer active layer 14b may have any other suitable thicknesses.

Further, in the above-described embodiment, when the outer active material layer 14b of outermost electrode 14 has a thickness of about one half of the thickness of the positive active material layer 11b of the positive electrode 11, the amount of the outer active material layer 14b reacting with the negative electrode 12 disposed closely inside the outermost electrode 14 correspond to each other, so the volume is not increased unnecessarily.

In addition, in one embodiment when the outer current collector 14a of the outermost electrode 14 is formed of a mesh structure, the outer active material layers 14b disposed on both surfaces of the outer current collector 14a may participate in the charge and discharge reaction. In addition, in the above-described embodiment, because the outer active material layers 14b are formed on both surfaces of the outer current collector 14a, distortion of the outermost electrode 14 is prevented or reduced.

Figure 3:
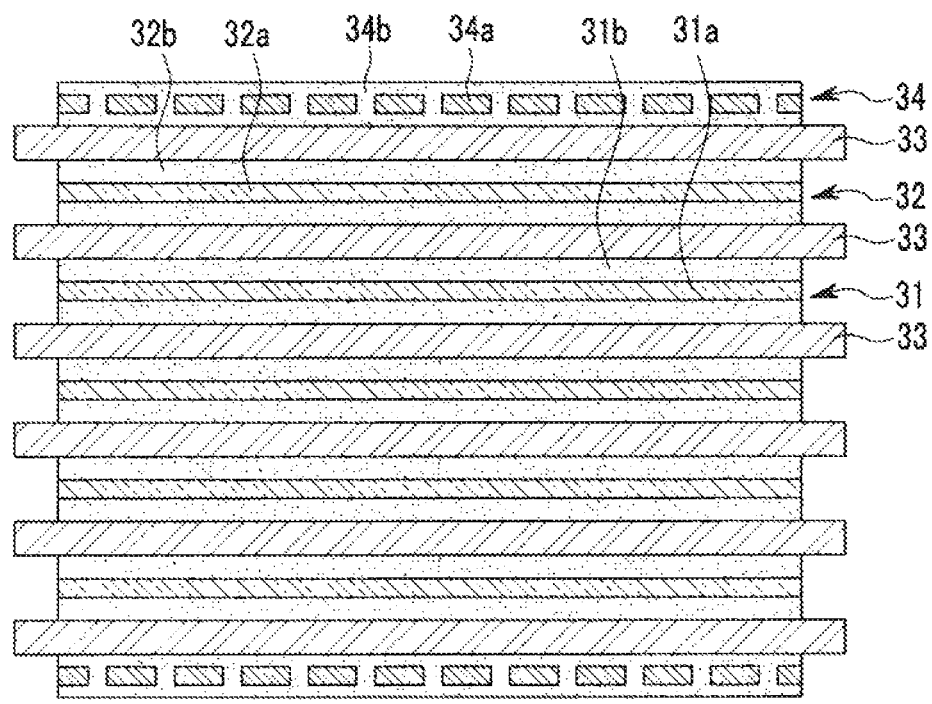
FIG. 3 is a cross-sectional view of an electrode assembly of a rechargeable battery according to another embodiment of the present invention.

FIG. 3 is a cross-sectional view of an electrode assembly of a rechargeable battery according to another embodiment of the present invention.

Referring to FIG. 3, the electrode assembly 30 according to one exemplary embodiment includes a positive electrode 31, a negative electrode 32, a separator 33 disposed between the positive electrode 31 and the negative electrode 32, and an outermost electrode 34 disposed on an outermost side of the electrode assembly 30.

According to one embodiment, a plurality of positive electrodes 31 and negative electrodes 32 are alternately stacked and laminated with a separator 33 interposed between each pair of adjacent positive and negative electrodes 31, 32, and two outermost electrodes 34 are disposed on the outermost sides of the electrode assembly 30. The outermost electrode 34 according to one embodiment, as shown in FIG. 3, is disposed adjacent to the negative electrode 32 with the separator 33 therebetween, and thus, the outermost electrode 34 acts as a positive electrode.

The positive electrode 31, in one embodiment, includes a positive current collector 31a and positive active material layers 31b formed on both surfaces of the positive current collector 31a. The positive current collector 31a, in one embodiment, is formed of a quadrangle flat sheet having no openings. The negative electrode 32, in one embodiment, includes a negative current collector 32a and negative active material layers 32b formed on both surfaces of the negative current collector 32a. The negative current collector 32a, in one embodiment, is formed of a quadrangle flat sheet having no openings.

The outermost electrode 34, in one embodiment, includes an outer current collector 34a and outer active material layers 34b formed on both surfaces of the outer current collector 34a, and the outer current collector 34a is formed of a mesh flat sheet having a plurality of openings. The outer active material layers 34b disposed on both surfaces of the outermost electrode 34 have a thickness less than a thickness of the positive active material layer 31b. Further, in one embodiment, the outer active material layer 34b has a thickness of about one half of the thickness of the positive active material layer 31b of the positive electrode.

According to the above-described embodiment, the positive electrode 31 and the negative electrode 32 disposed inside the outermost electrode 34 include a general current collector (e.g., a sheet that does not have openings) instead of a mesh current collector, but the outermost electrode 34 includes a mesh current collector. When the outermost electrode 34 is configured having the mesh current collector, the outer active material layers 34b disposed on both surfaces of the outer current collector 34a may participate in the charge and discharge so that the outer active material layer 34b may have a thin thickness.

Figure 4:
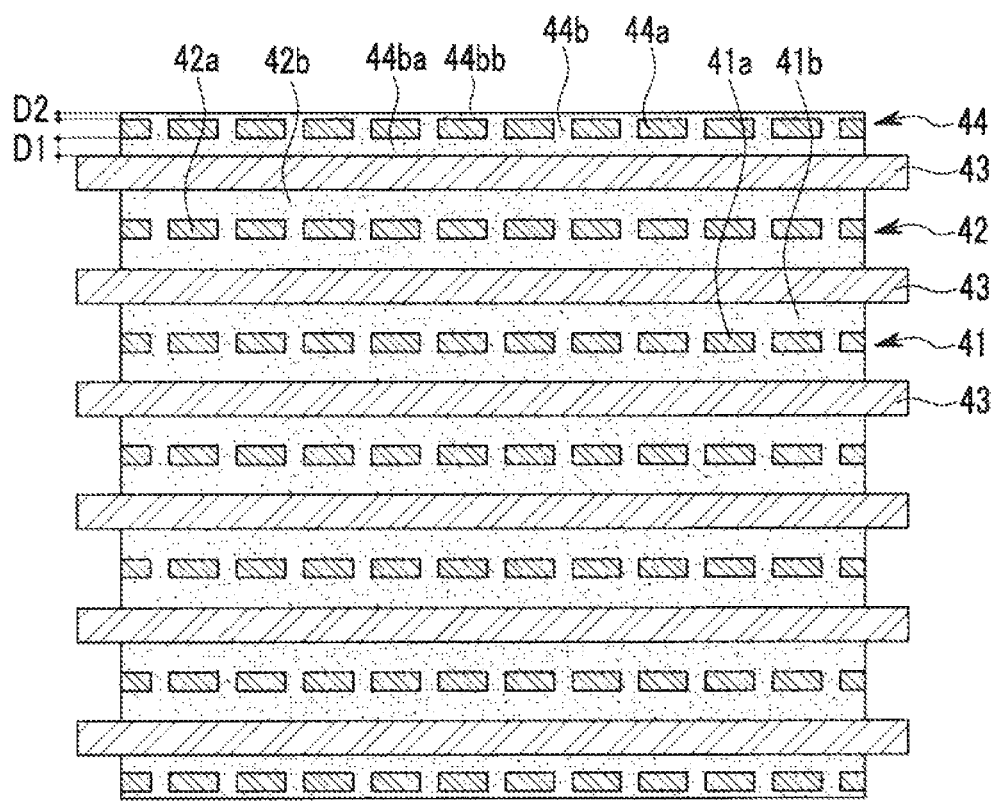
FIG. 4 is a cross-sectional view of an electrode assembly of a rechargeable battery according to another embodiment of the present invention.

FIG. 4 is a cross-sectional view of an electrode assembly of a rechargeable battery according to another embodiment of the present invention.

Referring to FIG. 4, an electrode assembly 40 according to one exemplary embodiment includes a positive electrode 41, a negative electrode 42, a separator 43 disposed between the positive electrode 41 and the negative electrode 42, and an outermost electrode 44 disposed on an outermost side of the electrode assembly 40.

In one embodiment, a plurality of positive electrodes 41 and negative electrodes 42 are alternately stacked and laminated with a separator 43 between each pair of adjacent positive and negative electrodes 41, 42, and two outermost electrodes 44 are disposed on the outermost sides of the electrode assembly 40. The outermost electrode 44 according to one embodiment, as shown in FIG. 4, is disposed adjacent to the negative electrode 42 with a separator 43 therebetween, and the outermost electrode 44 acts as a positive electrode.

The positive electrode 41, in one embodiment, includes a positive current collector 41a having a mesh structure and positive active material layers 41b formed on both surfaces of the positive current collector 41a. The negative electrode 42, in one embodiment, includes a negative current collector 42a having a mesh structure and negative active material layers 42b formed on both surfaces of the negative current collector 42a.

The outermost electrode 44, in one embodiment, includes an outer current collector 44a and outer active material layers 44b formed on both surfaces of the outer current collector 44a, and the outer current collector 44a is formed of a mesh flat sheet having a plurality of openings.

According to one embodiment, the outer active material layers 44b disposed on both surfaces of the outermost electrode 44 have a thickness less than a thickness of the positive active material layer 41a disposed on both surfaces of the positive electrode 41. Further, in one embodiment, the outer active material layer 44b of the outermost electrode 44 has a thickness of about one half of the thickness of the positive active material layer 41b of the positive electrode 41.

According to one embodiment, where a thickness of an outer active material layer 44ba disposed between the outer current collector 44a and the separator 43 is D1, and a thickness of an outer active material layer 44bb disposed on the outer side of outer current collector 44a is D2, in the outermost electrode 44, D1/D2 is 0.1 to 10. In other words, the active material layers 44ba and 44bb disposed on both surfaces of the outer current collector 44a in the outermost electrode 44 may be formed to have the same thickness, or one of the active material layers 44ba, 44bb may be up to about 10 times thicker than the other one of the active material layers 44ba, 44bb. In one embodiment, D1/D2 is ⅓ to 3. Further, in one embodiment, D1/D2 is 0.5 to 2.

Figure 5:
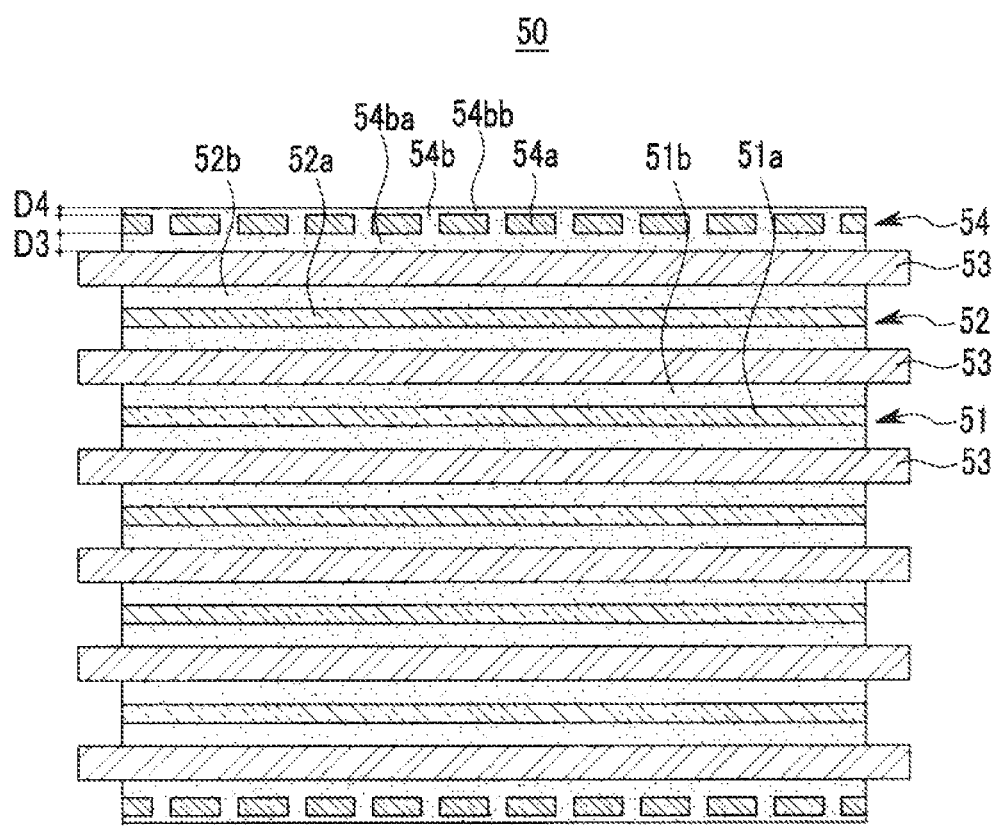
FIG. 5 is a cross-sectional view of an electrode assembly of a rechargeable battery according to another embodiment of the present invention.

FIG. 5 is a cross-sectional view of an electrode assembly of a rechargeable battery according to another embodiment of the present invention.

Referring to FIG. 5, the electrode assembly 50 according to one exemplary embodiment includes a positive electrode 51, a negative electrode 52, a separator 53 disposed between the positive electrode 51 and the negative electrode 52, and an outermost electrode 54 disposed on an outermost side of the electrode assembly 50.

In one embodiment, a plurality of positive electrodes 51 and negative electrodes 52 are alternately stacked and laminated with a separator 53 between each pair of adjacent positive and negative electrodes 51, 52, and two outermost electrodes 54 are disposed on the outermost sides of the electrode assembly 50. The outermost electrode 54 according to one embodiment, as shown in FIG. 5, is disposed adjacent to the negative electrode 52 with a separator 53 therebetween, and thus, the outermost electrode 54 acts as a positive electrode.

The positive electrode 51, in one embodiment, includes a positive current collector 51a and positive active material layers 51b formed on both surfaces of the positive current collector 51a. The positive current collector 51a, in one embodiment, is formed of a quadrangle flat sheet having no openings. The negative electrode 52, in one embodiment, includes a negative current collector 52a and negative active material layers 52b formed on both surfaces of the negative current collector 52a. The negative current collector 52a, in one embodiment, is formed of a quadrangle flat sheet having no openings.

The outermost electrode 54, in one embodiment, includes an outer current collector 54a and outer active material layers 54b formed on both surfaces of the outer current collector 54a, and the outer current collector 54a is formed of a mesh flat sheet having a plurality of openings. According to one embodiment, the outer active material layers 54b disposed on both surfaces of the outermost electrode 54 have a thickness less than a thickness of the positive active material layer 51b. Further, in one embodiment, the outer active material layer 54b has a thickness of about one half of the thickness of the positive active material layer 51b of the positive electrode.

According to one embodiment, where a thickness of an outer active material layer 54ba disposed between the outer current collector 54a and the separator 53 is D3, and a thickness of an outer active material layer 54bb disposed on the outer side of outer current collector 54a is D4, in the outermost electrode 54, D3/D4 is 0.1 to 10. In other words, the active material layers 54*ba* and 54*bb* disposed on both surfaces of the outer current collector 54*a* in the outermost electrode 54 may be formed to have the same thickness, or one of the active material layers 54*ba*, 54*bb* may be up to about 10 times thicker than the other one of the active material layers 54*ba*, 54*bb*. In one embodiment, D3/D4 is ⅓ to 3. Further, in one embodiment, D3/D4 is 0.5 to 2.

While this disclosure has been described in connection with what is presently considered to be some exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly comprising:
   a positive electrode comprising a positive current collector and a positive active material on the positive current collector;
   a negative electrode comprising a negative current collector and a negative active material on the negative current collector;
   an outer electrode comprising an outer current collector and an outer active material on the outer current collector, one of the positive electrode or the negative electrode being between the outer electrode and the other of the positive electrode or the negative electrode;
   an inner separator between the positive electrode and the negative electrode; and
   an outer separator between the outer electrode and the one of the positive electrode or the negative electrode,
   wherein the outer current collector comprises an outer surface facing away from the outer separator and an inner surface facing toward the outer separator, and the outer active material is on both the outer surface and the inner surface,
   wherein a thickness of the outer active material that is a total thickness of the outer active material on both the outer surface and the inner surface is less than each of a thickness of the positive active material that is a total thickness of the positive active material on both of opposite surfaces of the positive current collector and a thickness of the negative active material that is a total thickness of the negative active material on both of opposite surfaces of the negative current collector, and
   wherein the positive electrode and the negative electrode are stacked with the inner separator and the outer separator at an inner side of the outer electrode, and the one of the positive electrode or the negative electrode is stacked between the outer separator and the inner separator.

2. The electrode assembly of claim 1, wherein the thickness of the outer active material is one half of at least one of the thickness of the positive active material or the thickness of the negative active material.

3. The electrode assembly of claim 1, wherein the outer current collector comprises a sheet having a plurality of openings.

4. The electrode assembly of claim 3, wherein the sheet is a mesh-type sheet.

5. The electrode assembly of claim 1, wherein at least one of the positive current collector or the negative current collector comprises a sheet having a plurality of openings.

6. The electrode assembly of claim 5, wherein the outer current collector comprises a sheet having a plurality of openings larger than the openings of the at least one of the positive current collector or the negative current collector.

7. The electrode assembly of claim 1, wherein at least one of the positive current collector or the negative current collector comprises a sheet that does not have openings.

8. The electrode assembly of claim 1, wherein the outer electrode is a first outer electrode, and the electrode assembly further comprises a second outer electrode, the positive electrode and the negative electrode being between the first and second outer electrodes.

9. The electrode assembly of claim 1, wherein a thickness of the outer active material on the outer surface is different than a thickness of the outer active material on the inner surface.

10. The electrode assembly of claim 1, wherein the thickness of the outer active material on one of the outer surface or the inner surface is between about 1 to about 10 times of the thickness of the outer active material on the other of the outer surface or the inner surface.

11. The electrode assembly of claim 10, wherein the thickness of the outer active material on the one of the outer surface or the inner surface is between about 1 to about 3 times of the thickness of the outer active material on the other of the outer surface or the inner surface.

12. A rechargeable battery comprising:
   an electrode assembly comprising:
      a positive electrode comprising a positive current collector and a positive active material on the positive current collector;
      a negative electrode comprising a negative current collector and a negative active material on the negative current collector;
      an outer electrode comprising an outer current collector and an outer active material on the outer current collector, one of the positive electrode or the negative electrode being between the outer electrode and the other of the positive electrode or the negative electrode;
      an inner separator between the positive electrode and the negative electrode; and
      an outer separator between the outer electrode and the one of the positive electrode or the negative electrode,
      wherein the outer current collector comprises an outer surface facing away from the outer separator and an inner surface facing toward the outer separator, and the outer active material is on both the outer surface and the inner surface,
      wherein a thickness of the outer active material that is a total thickness of the outer active material on both the outer surface and the inner surface is less than each of a thickness of the positive active material that is a total thickness of the positive active material on both of opposite surfaces of the positive current collector and a thickness of the negative active material that is a total thickness of the negative active material on both of opposite surfaces of the negative current collector, and
      wherein the positive electrode and the negative electrode are stacked with the inner separator and the outer separator at an inner side of the outer electrode, and the one of the positive electrode or the negative electrode is stacked between the outer separator and the inner separator; and
   a case containing the electrode assembly therein.

13. The rechargeable battery of claim 12, wherein the thickness of the outer active material is one half of at least one of the thickness of the positive active material or the thickness of the negative active material.

14. The rechargeable battery of claim 12, wherein the outer current collector comprises a sheet having a plurality of openings.

15. The rechargeable battery of claim 14, wherein the sheet is a mesh-type sheet.

16. The rechargeable battery of claim 12, wherein at least one of the positive current collector or the negative current collector comprises a sheet having a plurality of openings.

17. The rechargeable battery of claim 16, wherein the outer current collector comprises a sheet having a plurality of openings larger than the openings of the at least one of the positive current collector or the negative current collector.

18. The rechargeable battery of claim 12, wherein at least one of the positive current collector or the negative current collector comprises a sheet that does not have openings.

19. The rechargeable battery of claim 12, wherein the outer electrode is a first outer electrode, and the electrode assembly further comprises a second outer electrode, the positive electrode and the negative electrode being between the first and second outer electrodes.

20. The rechargeable battery of claim 12, wherein a thickness of the outer active material on the outer surface is different than a thickness of the outer active material on the inner surface.

21. The rechargeable battery of claim 12, wherein the thickness of the outer active material on one of the outer surface or the inner surface is between about 1 to about 10 times of the thickness of the outer active material on the other of the outer surface or the inner surface.

22. The rechargeable battery of claim 21, wherein the thickness of the outer active material on the one of the outer surface or the inner surface is between about 1 to about 3 times of the thickness of the outer active material on the other of the outer surface or the inner surface.

* * * * *